H. T. DUNBAR.
WHEEL.
APPLICATION FILED MAR. 2, 1911.
1,048,666.
Patented Dec. 31, 1912.
3 SHEETS—SHEET 1.
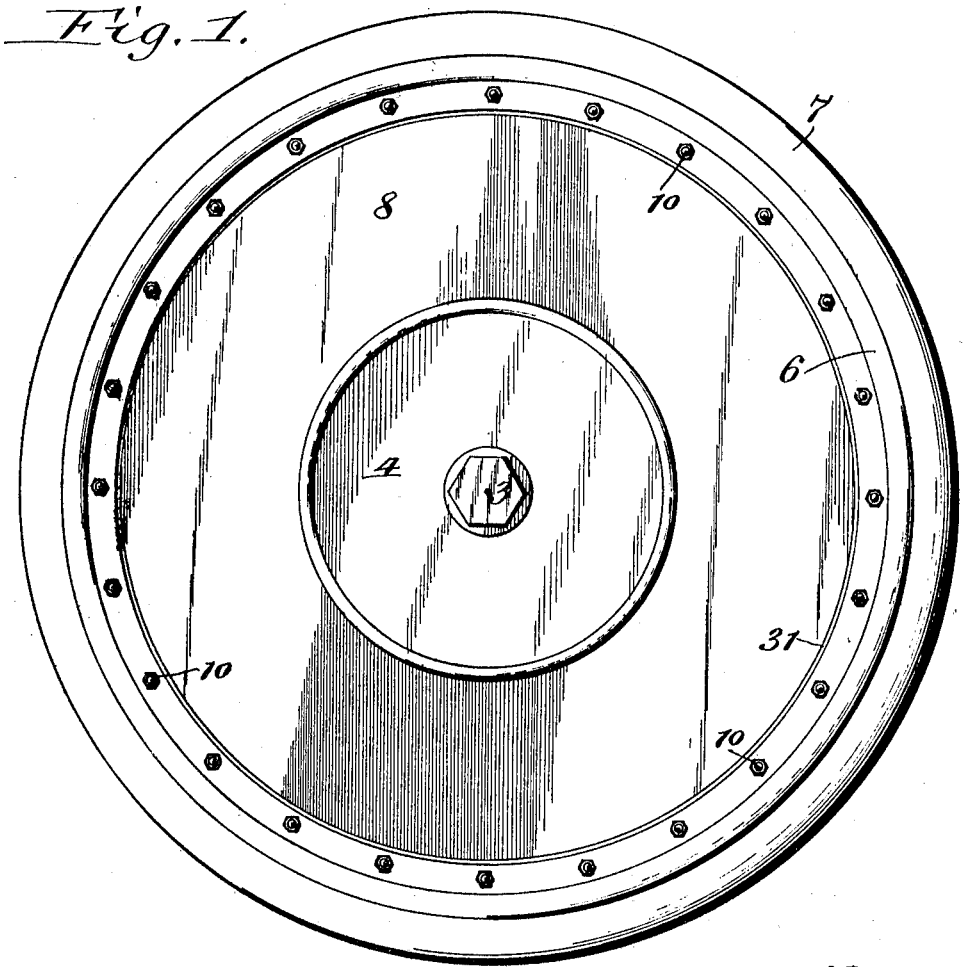
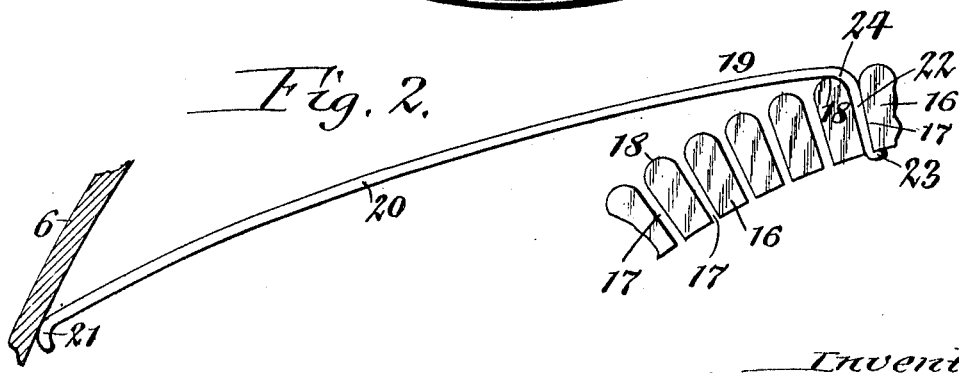

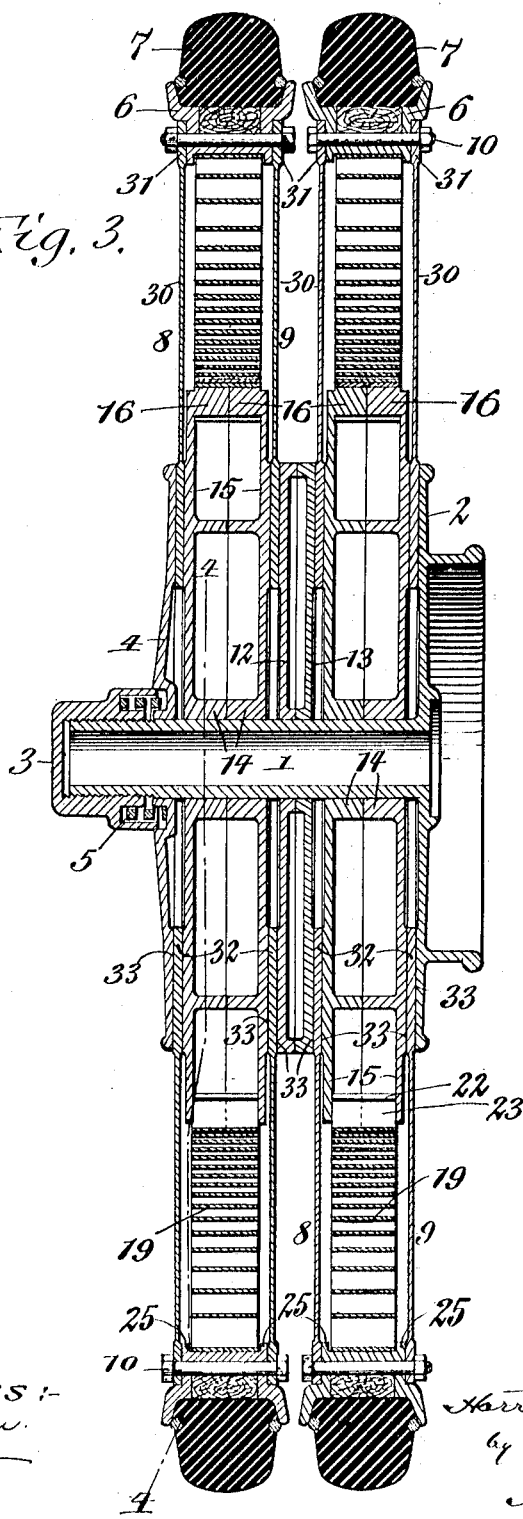

H. T. DUNBAR.
WHEEL.
APPLICATION FILED MAR. 2, 1911.
1,048,666.
Patented Dec. 31, 1912.
3 SHEETS—SHEET 3.
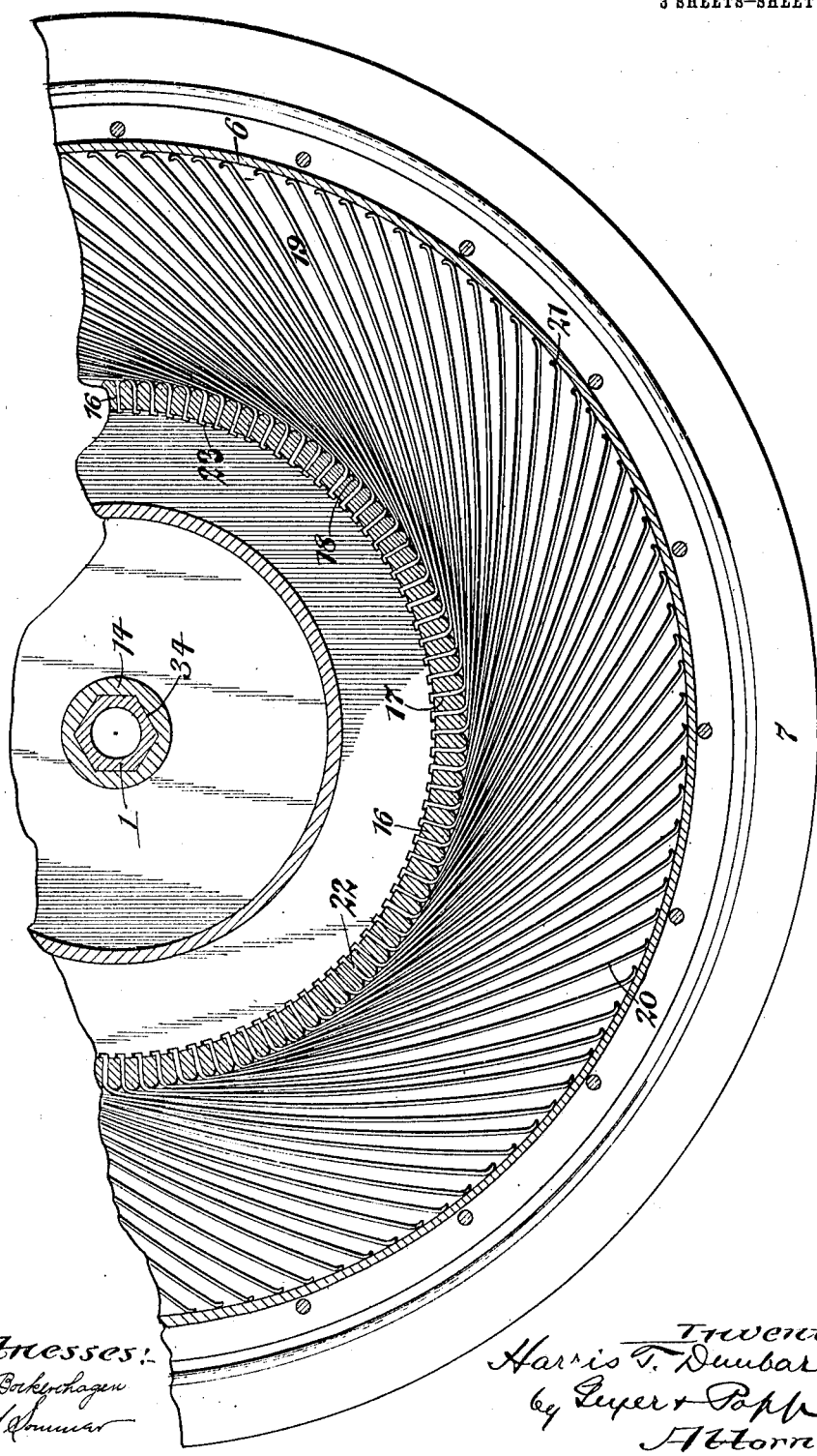

UNITED STATES PATENT OFFICE.

HARRIS T. DUNBAR, OF BUFFALO, NEW YORK.

WHEEL.

1,048,666.  Specification of Letters Patent.  Patented Dec. 31, 1912.

Application filed March 2, 1911. Serial No. 611,813.

*To all whom it may concern:*

Be it known that I, HARRIS T. DUNBAR, a citizen of the United States, residing at Buffalo, in the county of Erie and State of New York, have invented new and useful Improvements in Wheels, of which the following is a specification.

Wheels having pneumatic tires have been found incapable of sustaining very heavy loads and their use has therefore been confined to automobiles and other wheeled vehicles of comparatively light weight. To obviate this difficulty commercial automobiles designed to carry heavy loads have been provided with solid rubber tires and for extra heavy traffic the wheels have each been provided with two solid rubber tires so as to increase the elastic bearing surface of the wheel. Such double tired wheels have, however, failed to accomplish the desired result in traveling over rough roads or roads having a comparatively high camber because only the rear or inner tires of the wheels in such cases would come fully in contact with the ground and therefore support the bulk of the load. Moreover the wheels drag considerably when turning corners, whereby the tires are subjected to undue wear.

It is the object of this invention to produce a vehicle wheel which yieldingly supports the load and which permits of distributing the load more equally over the tires, and also minimizes the wear upon the tires due to dragging while the wheels turn corners.

In the accompanying drawings consisting of 3 sheets: Figure 1 is a side elevation of my improved wheel. Fig. 2 is a fragmentary elevation of the same showing one of the main cushioning or supporting springs and adjacent parts of the wheel. Fig. 3 is a vertical section of the wheel taken lengthwise at its axis. Fig. 4 is a vertical longitudinal section on the same taken in line 4—4, Fig. 3.

Similar letters of reference indicate corresponding parts throughout the several views.

1 represents the inner section of the hub of the wheel which is preferably of tubular form and adapted to be secured to an axle or driving shaft of the vehicle in any suitable manner. At its rear end this inner hub section is provided with a rear external friction disk 2 which is preferably formed integrally therewith and at its front end this hub section has an external screw thread which receives a screw nut 3.

4 represents a front external friction disk mounted on the front part of the inner hub section in rear of the screw nut and 5 is a tension spring surrounding the inner hub section and bearing at its rear end against the front friction disk and at its front end against the rear end of the screw nut.

6, 6 represents a plurality of rims or fellies arranged side by side around the hub, two of such rims being shown, for example, in Fig. 3, although this number may be varied, if desired. Each of these rims may be provided on its periphery with a tire 7 of any suitable construction. On its front and rear sides each of these rims is provided with annular friction webs or rings 8, 9 which project inwardly from the rim. These webs or rings are preferably constructed of sheet metal or other suitable material and the members of each pair are secured at their outer edges to opposite sides of the respective rim by means of bolts 10, as shown in the drawings, or by any other suitable means.

In the assembled condition of the parts the front friction disk bears against the outer side of the front web or ring of the front rim and the rear friction disk bears against the outer side of the rear friction web or ring of the rear rim.

On the central part of the periphery of the inner hub section two intermediate friction disks 12, 13 are arranged side by side in engagement with each other. The front one 12 of the intermediate friction webs engages with the outer side of the rear web of the front rim and the rear one 13 of the intermediate friction web bears against the outer side of the front web of the rear rim, as shown in Fig. 3. On the front and rear parts of the inner hub section and on opposite sides of the intermediate friction disks are arranged two outer hub sections each of which preferably comprises two sleeves 14, 14 which are arranged side by side and engage with each other. Each of these sleeves is provided with an outwardly projecting internal friction disk 15, the disk of one sleeve of a hub section bearing against the inner side of the front web of one rim and the other internal friction disk of the companion sleeve bearing against the inner side of the rear web of the respective rim.

The several friction webs or rings and disks are pressed against one another by the tension of the spring 5 whereby a frictional connection is effected between the hub and rims which holds the latter against displacement in a direction lengthwise of the hub but permits the rims to move laterally or radially relatively to the hub.

The intermediate part 30 of each web is reduced while its outer edge 31 is comparatively thick which enables the bolts 10 to obtain a more substantial hold on the webs. The inner edge 32 of each web is also thickened so as to form elevated annular bearing faces whereby these webs engage with the friction disks and the several friction disks are similarly provided with thickened parts 33 forming elevated annular bearing surfaces which engage with the elevated bearing surfaces of the webs. By thus constructing the coöperating parts of the friction webs and disks the same are caused to wear parallel and always bear fully against each other so as to obtain the maximum frictional contact between the same. In the absence of these high bearing surfaces on the webs and disks an uneven wear on the same would be liable to occur so that the contact between the webs and disks would not be parallel and the friction between the same would be reduced accordingly.

The inner hub section and friction disks are preferably compelled to turn together the means for effecting this consisting preferably in constructing the periphery of the inner hub section of flat sided form and constructing the openings of the front and intermediate disks and the bores of the sleeves of the internal friction disks which engage with the inner hub section of corresponding form. This flat sided joint between the parts just described is preferably of hexagonal form, as shown at 34 in Fig. 4.

Each of the rims together with the parts connected therewith is yieldingly held in its central or normal position in which it is concentric relatively to the hub by means of a yielding tension device which is preferably constructed as follows: On the inner opposing sides of each pair of internal friction disks and between the inner and outer edges thereof the same are provided with two annular rows of supporting lugs 16, the lugs of both rows abutting against each other and the lugs of each row being separated one from another by intervening spaces 17 so that the corresponding spaces of both rows form radial sockets. The inner ends of the lugs 16 are flat but their outer ends are rounded or convex, as shown at 18 in Figs. 2 and 4, for purposes to be hereinafter described.

In the annular space between each rim and the companion row of lugs 16 is arranged an annular row of main or cushioning springs 19 each of which is preferably constructed of a strip or leaf of spring steel so as to form a comparatively long and flat outer part or body 20 having its outer end turned or slightly rounded to form a bearing shoe 21 and a neck 22 projecting laterally inward from the inner end of the body and provided at its inner end with a stop lip 23 which projects in a direction opposite to the body of the spring. In the assembled condition of the parts the neck of each spring 19 is arranged radially in one of the sockets 17 between adjacent pairs of lugs 16 and engages its lip 23 with the inner end of the lug on one side of the neck while the body of the spring is arranged substantially tangential in the space between the rim and lugs and bears at its inner end against the outer end of the lug 16 on the opposite side of the neck while the turned outer end or shoe 21 of the body bears against the bore of the respective rim. The corner 24 between the body and neck of each main spring is rounded, as shown in Figs. 2 and 4, and engages with the rounded outer end of the adjacent lug 16, whereby the spring body may bend relatively to its neck without liability of breaking at this place.

When the several main springs are assembled the inner ends of the bodies thereof are arranged close together and bear one against another while their outer ends are separated a considerable distance, as shown in Fig. 4.

While the main springs are thus deflected and relaxed during operation their outer ends slide on the rims and to permit them to slide freely and reduce wear the coöperating surfaces of the rims and springs are lubricated by a suitable oil or grease.

As the hub and rims are shifted radially relatively to each other while under a load the main springs are deflected inwardly and are wrapped more closely around one another, whereby the leverage of these springs is gradually shortened and the sustaining capacity thereof is increased inversely as the square of their length.

When the two tires and rims run over an uneven surface one rim is permitted to yield and rise upon engaging its tire with the high part of the road while the tire of the other rim remains in a relatively lower position and engages with the low part of the road. By this means an equalization of the bearing surface of the wheel is obtained which causes a better distribution of the load over both tires at all times regardless of whether the wheel is running over even or uneven surfaces instead of concentrating the pressure on a comparatively small area of the wheel, as is the case in wheels of ordinary construction. Furthermore, by mounting the rims independently of each other on the hub it is possible for the rims to turn differentially relatively to each other when turning corners, thereby avoiding or reducing lateral drag on the wheel and minimizing the wear on the same at this time.

At opposite edges of the bore of each rim the same is provided with inwardly projecting annular flanges 25 so that the same forms a channel which has its hollow or concave side facing inwardly. The outer ends of each set of main springs bear against the bore of the adjacent rim between its internal flanges 25, whereby these springs are not only prevented from wearing the inner sides of the friction webs but the springs are also prevented from pressing the lubricant out through the joints between the webs and rim and producing an unsightly streak of oil on the exterior of the wheel.

I claim as my invention:

1. A wheel comprising front and rear rims which are arranged side by side and each of which has a pair of inwardly projecting front and rear annular friction webs, an inner hub section having a friction disk at its rear end which bears against the outer side of the rear web of the rear rim, a screw nut arranged on the front end of the inner hub section, a front friction disk mounted on the outer part of the hub and bearing against the outer side of the front web of the front rim, a spring interposed between said screw nut and front friction disk, front and rear intermediate friction disks arranged on the central part of the inner hub section, front and rear outer hub sections mounted on the front and rear parts of the inner hub section, said front outer hub section having a front friction disk bearing against the inner side of the front web of the front rim and a rear friction disk bearing against the inner side of the rear web of the front rim and said rear outer hub section having a front friction disk bearing against the inner side of the front web of the rear rim and a rear friction disk bearing against the inner side of the rear web of the rear rim, and yielding means for holding said rims in a concentric position relatively to said outer hub sections.

2. A wheel comprising front and rear rims which are arranged side by side and each of which has a pair of inwardly projecting front and rear annular friction webs, an inner hub section having a friction disk at its rear end which bears against the outer side of the rear web of the rear rim, a screw nut arranged on the front end of the inner hub section, a front friction disk mounted on the outer part of the hub and bearing against the outer side of the front web of the front rim, a spring interposed between said screw nut and front friction disk, front and rear intermediate friction disks arranged on the central part of the inner hub section, front and rear outer hub sections mounted on the front and rear parts of the inner hub section, said front outer hub section having a front friction disk bearing against the inner side of the front web of the front rim and a rear friction disk bearing against the inner side of the rear web of the front rim and said rear outer hub section having a front friction disk bearing against the inner side of the front web of the rear rim and a rear friction disk bearing against the inner side of the rear web of the rear rim, and yielding means for holding said rims in a concentric position relatively to said outer hub sections, said yielding means comprising a plurality of tangential springs connected at their inner ends with the disks of said outer hub sections while their outer ends engage slidingly with the inner sides of said rims.

3. A wheel comprising front and rear rims which are arranged side by side and each of which has a pair of inwardly projecting front and rear annular friction webs, an inner hub section having a friction disk at its rear end which bears against the outer side of the rear web of the rear rim, a screw nut arranged on the front end of the hub, a front friction disk mounted on the outer part of the hub and bearing against the outer side of the front web of the front rim, a spring interposed between said screw nut and front friction disk, front and rear intermediate friction disks arranged on the central part of the inner hub section, front and rear outer hub sections mounted on the front and rear parts of the inner hub section, said front outer hub section having a front friction disk bearing against the inner side of the front web of the front rim and a rear friction disk bearing against the inner side of the rear web of the front rim and said rear outer hub section having a front friction disk bearing against the inner side of the front web of the rear rim and a rear friction disk bearing against the inner side of the rear web of the rear rim, and yielding means for holding said rims in a concentric position relatively to said outer hub sections, the periphery of said inner hub section being of flat sided form and the bores of said front and intermediate disks and outer hub sections being of corresponding form to fit the inner hub section.

4. A wheel comprising a rim, a hub provided with an annular row of radial lugs which are separated by intervening sockets, and a plurality of springs arranged in an annular row and each having a tangential body bearing at its outer end against the inner side of said rim while its inner end bears against the outer side of one of said lugs and is provided with a radial neck arranged in one of said sockets and having a lip at the inner end of said neck which bears against the inner side of one of said lugs.

5. A wheel comprising a rim having two inwardly projecting webs, an inner section, outer friction disks arranged on the inner hub section and bearing against the outer sides of said webs, an outer hub section composed of two sleeves which are arranged side by side on the inner hub section and provided with inner friction disks bearing against the inner sides of said webs and said inner disks being provided on their opposing sides with annular rows of lugs which are arranged in pairs side by side, adjacent pairs of said lugs being separated by intervening spaces forming sockets, and a plurality of leaf springs arranged in an annular row and each spring having a tangential outer part or body which bears at its outer end against the bore of said rim while its inner end bears against the outer ends of one pair of said lugs and the inner end of each spring body being provided with an inwardly projecting neck which is arranged in one of said sockets and is provided at its inner end with a lip bearing against the inner end of an adjacent pair of said lugs.

6. A wheel comprising a rim, webs projecting inwardly from said rim and provided with thickened inner edges forming elevated bearing surfaces, a hub, friction disks arranged on said hub and provided with elevated bearing surfaces which engage with the corresponding surfaces of said webs, and springs interposed between said hub and rim.

Witness my hand this 28 day of February, 1911.

HARRIS T. DUNBAR.

Witnesses:
E. M. GRAHAM,
ANNA HEIGIS.

---

Copies of this patent may be obtained for five cents each, by addressing the "Commissioner of Patents, Washington, D. C."